(12) United States Patent
Yang

(10) Patent No.: US 7,625,417 B2
(45) Date of Patent: Dec. 1, 2009

(54) FILTER SCREEN STRUCTURE

(75) Inventor: Kuo-Hsiang Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 247 days.

(21) Appl. No.: 11/489,567

(22) Filed: Jul. 20, 2006

(65) Prior Publication Data
US 2007/0256399 A1    Nov. 8, 2007

(30) Foreign Application Priority Data
May 4, 2006   (TW) ............................... 95207600 U

(51) Int. Cl.
*B01D 46/52* (2006.01)
(52) U.S. Cl. ............................ 55/487; 55/418; 55/484; 55/488; 55/489; 55/501; 55/521
(58) Field of Classification Search .................. 55/418, 55/440, 442, 443, 444, 445, 446, 462, 464, 55/465, 486, 487, 488, 489, 499, 501, 385.1, 55/385.2, 521, 484
See application file for complete search history.

(56) References Cited

U.S. PATENT DOCUMENTS

| | | | | |
|---|---|---|---|---|
| 1,883,715 A * | 10/1932 | Greene | ...................... | 55/485 |
| 2,479,722 A * | 8/1949 | Brixius | ...................... | 55/499 |
| 2,763,251 A * | 9/1956 | Dolza | ...................... | 123/556 |
| 3,109,724 A * | 11/1963 | Heckman et al. | ............... | 55/514 |
| 3,144,315 A * | 8/1964 | Hunn | ...................... | 96/421 |
| 3,744,222 A * | 7/1973 | Delao | ...................... | 55/446 |
| 3,747,772 A * | 7/1973 | Brown | ...................... | 210/493.1 |
| 3,999,964 A * | 12/1976 | Carr | ...................... | 96/59 |
| 4,292,061 A * | 9/1981 | Land | ...................... | 55/493 |
| 4,701,197 A * | 10/1987 | Thornton et al. | ............... | 55/487 |
| 5,968,373 A * | 10/1999 | Choi | ...................... | 210/806 |
| 5,989,303 A * | 11/1999 | Hodge | ...................... | 55/486 |
| 6,312,489 B1 * | 11/2001 | Ernst et al. | ................. | 55/385.3 |
| 6,322,615 B1 * | 11/2001 | Chapman | ...................... | 96/67 |
| 6,514,324 B1 * | 2/2003 | Chapman | ...................... | 96/67 |
| 6,579,337 B2 * | 6/2003 | Heilmann et al. | ............. | 55/495 |
| 6,585,793 B2 * | 7/2003 | Richerson et al. | ............. | 55/521 |
| 6,656,243 B2 * | 12/2003 | Hodge | ...................... | 55/418 |
| 6,709,480 B2 * | 3/2004 | Sundet et al. | ................. | 55/499 |
| 6,740,137 B2 * | 5/2004 | Kubokawa et al. | ............ | 55/521 |
| 6,790,397 B2 * | 9/2004 | Richerson et al. | ........... | 264/154 |
| 6,825,136 B2 * | 11/2004 | Cook et al. | ..................... | 442/6 |
| 6,840,387 B2 * | 1/2005 | Beer et al. | .................. | 210/490 |
| 6,926,750 B2 * | 8/2005 | Tanaka et al. | ................. | 55/486 |
| 6,979,361 B2 * | 12/2005 | Mihayiov et al. | .............. | 96/26 |
| 6,986,842 B2 * | 1/2006 | Bortnik et al. | .............. | 210/232 |
| 7,063,733 B2 * | 6/2006 | Mori et al. | ..................... | 96/135 |
| 7,235,115 B2 * | 6/2007 | Duffy et al. | ................... | 55/497 |

(Continued)

*Primary Examiner*—Duane Smith
*Assistant Examiner*—Robert A Clemente
(74) *Attorney, Agent, or Firm*—Birch, Stewart, Kolasch & Birch, LLP

(57) ABSTRACT

A filter screen structure includes a filter screen having air vents distributed thereon, and one or more layers of impedance material attached to the filter screen to increase an impedance of the filter screen and reduce the speed of air flowing through the filter screen. Through proper attachment of the impedance material to the filter screen in predetermined manners, the speed of air flown through the filter screen may be effectively adjusted to thereby regulate the volume of air flown through the filter screen.

13 Claims, 7 Drawing Sheets

U.S. PATENT DOCUMENTS

| | | | |
|---|---|---|---|
| 7,247,237 B2 * | 7/2007 | Mori et al. | 210/338 |
| 7,326,266 B2 * | 2/2008 | Barnwell | 55/319 |
| 2002/0104299 A1 * | 8/2002 | Chang | 55/497 |
| 2003/0106295 A1 * | 6/2003 | Beer et al. | 55/486 |
| 2004/0025485 A1 * | 2/2004 | Lee | 55/486 |
| 2004/0098957 A1 * | 5/2004 | Yoo et al. | 55/410 |
| 2004/0163372 A1 * | 8/2004 | Nguyen | 55/497 |

* cited by examiner

FILTER SCREEN STRUCTURE

FIELD OF THE INVENTION

The present invention relates to a filter screen, and more particularly to a filter screen structure capable of regulating the volume of air passing therethrough.

BACKGROUND OF THE INVENTION

Please refer to FIG. 1 that is a perspective view of a conventional filter screen structure 10 formed from a corrugated filter screen 11 having a plurality of air vents 12 evenly distributed thereon, so that air may smoothly flow through the filter screen 11. The conventional filter screen structure 10 may be generally divided into three types. In the first type, the corrugated filter screen 11 has a fixed corrugation height H and a fixed corrugation pitch P, as shown in FIG. 2A. In the second type, the corrugated filter screen 11 has a fixed corrugation pitch P but different corrugation heights H, H', as shown in FIG. 2B. In the third type, the corrugated filter screen 11 has a fixed corrugation height H but different corrugation pitches P, P', as shown in FIG. 2C. FIGS. 2A, 2B, and 2C are side views of the above-mentioned first, second, and third types of the conventional filter screen structure 10, respectively. As can be seen from FIG. 2A, with the fixed corrugation height H and pitch P of the first type of filter screen structure 10, the speed of air passing different areas of the filter screen 11 under a fixed pressure is always the same. In FIG. 2B, with the different corrugation heights H, H' of the second type of filter screen structure 10, the filter screen 11 has a high impedance at an area with the larger corrugation height H, and a low impedance at an area with the smaller corrugation height H'. Therefore, under a fixed pressure, the speed of air flown through the area of the filter screen 11 having the higher corrugations is smaller than that of the air flown through the area having lower corrugations. In FIG. 2C, with the different corrugation pitches P, P' of the third type of filter screen structure 10, the filter screen 11 has a high impedance at an area with the smaller corrugation pitch P, and a low impedance at an area with the larger corrugation pitch P'. Therefore, under a fixed pressure, the speed of air flown through the area of the filter screen 11 having the smaller corrugations pitch P is smaller than that of the air flown through the area having the larger corrugation pitch P'.

A main purpose of the above second and third types of the conventional filter screen structure 10 is to produce different air flow rates on the filter screen 11 under a fixed pressure, so as to achieve the object of regulating the volume of air passing through the filter screen 11.

The filter screen 11 is provided with a plurality of air vents 12 evenly distributed thereon for the air to smoothly flow through the filter screen 11. It is observed that the speed of air flown through the filter screen 11 is in direct ratio to a pressure difference between a top and a bottom surface of the filter screen 11. That is, when it is desired for an increased air volume to pass through the filter screen 11, there must be a larger pressure difference between the top and the bottom surface of the filter screen 11. On the other hand, when it is desired for a decreased air volume to pass through the filter screen 11, there must be a smaller pressure difference between the top and the bottom surface of the filter screen 11. With the pressure difference between the top and the bottom surface of the filter screen 11, the airflow may overcome the impedance of the filter screen 11 to pass through the latter.

In the conventional filter screen structure 10, it is necessary to change the corrugation pitch P and the corrugation height H of the filter screen 11 to achieve the purpose of regulating the air flow, as the above-described second and third types of the filter screen structure 10. However, the different corrugation heights and pitches increase difficulties in fabricating and mass-producing the filter screen 11.

SUMMARY OF THE INVENTION

A primary object of the present invention is to provide a filter screen structure that may be easily adjusted to different impedances to thereby regulate the volume of air passing therethrough.

Another object of the present invention is to provide a filter screen structure that could be mass-produced.

To achieve the above and other objects, the filter screen structure of the present invention includes a corrugated filter screen having a fixed corrugation height and a fixed corrugation pitch, and one or more layers of an impedance material. The filter screen is partially or fully covered by the impedance material to increase the impedance thereof and thereby reduce the speed of air flowing through the filter screen. Therefore, the volume of air passing through the filter screen may be regulated without the need of giving the corrugations different heights and/or different pitches.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
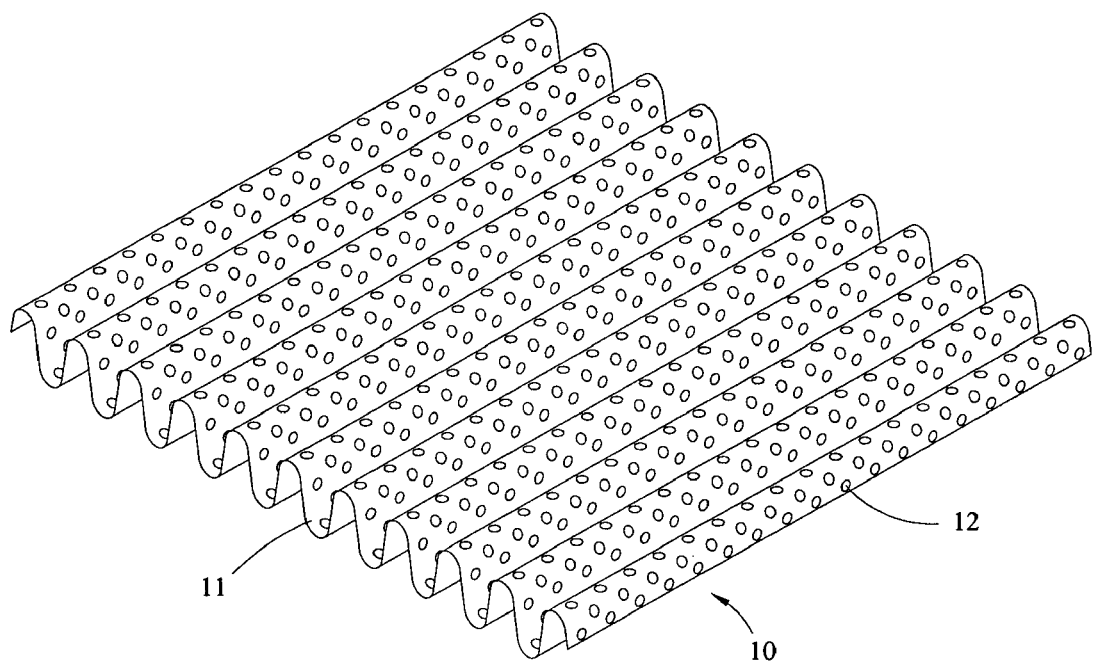
FIG. 1 is a perspective view of a conventional filter screen structure.
Figure 2A:
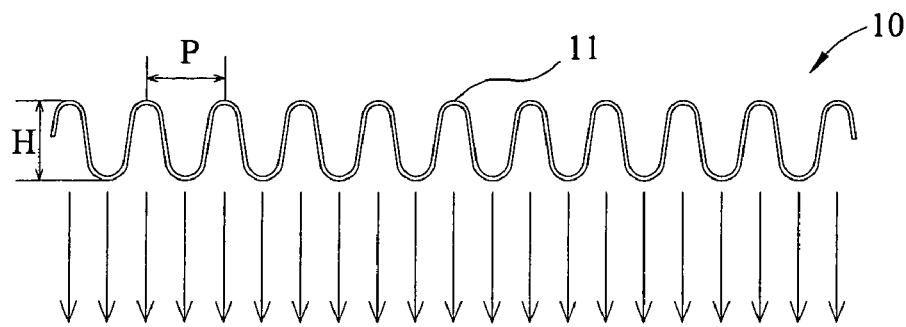
FIG. 2A is a side view of a first type of the conventional filter screen structure.
Figure 2B:
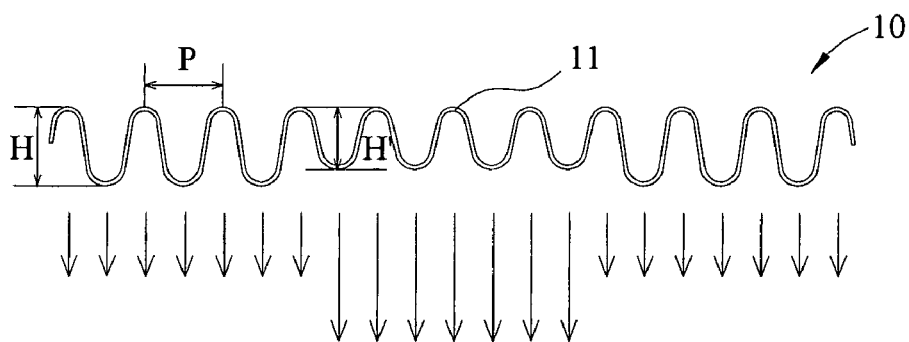
FIG. 2B is a side view of a second type of the conventional filter screen structure.
Figure 2C:
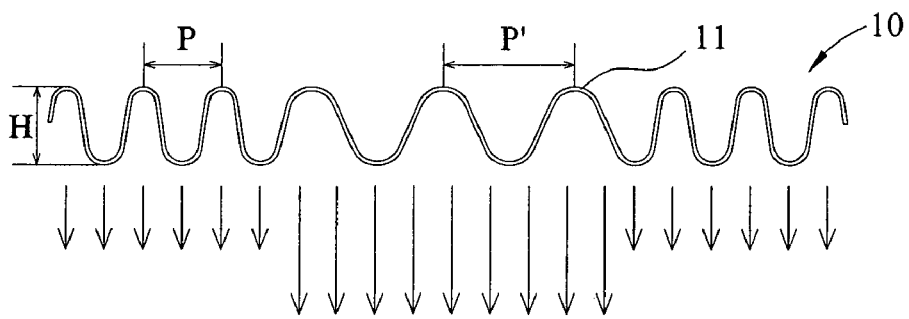
FIG. 2C is a side view of a third type of the conventional filter screen structure.
Figure 3:
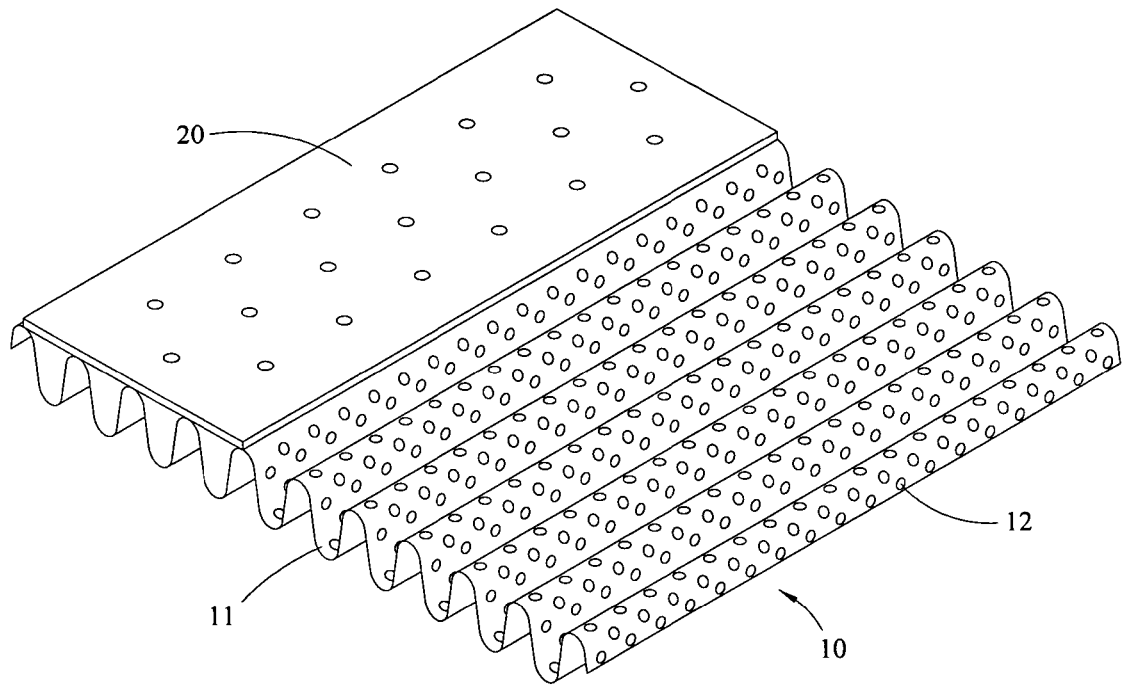
FIG. 3 is a perspective view of a filter screen structure according to a first embodiment of the present invention.
Figure 4:
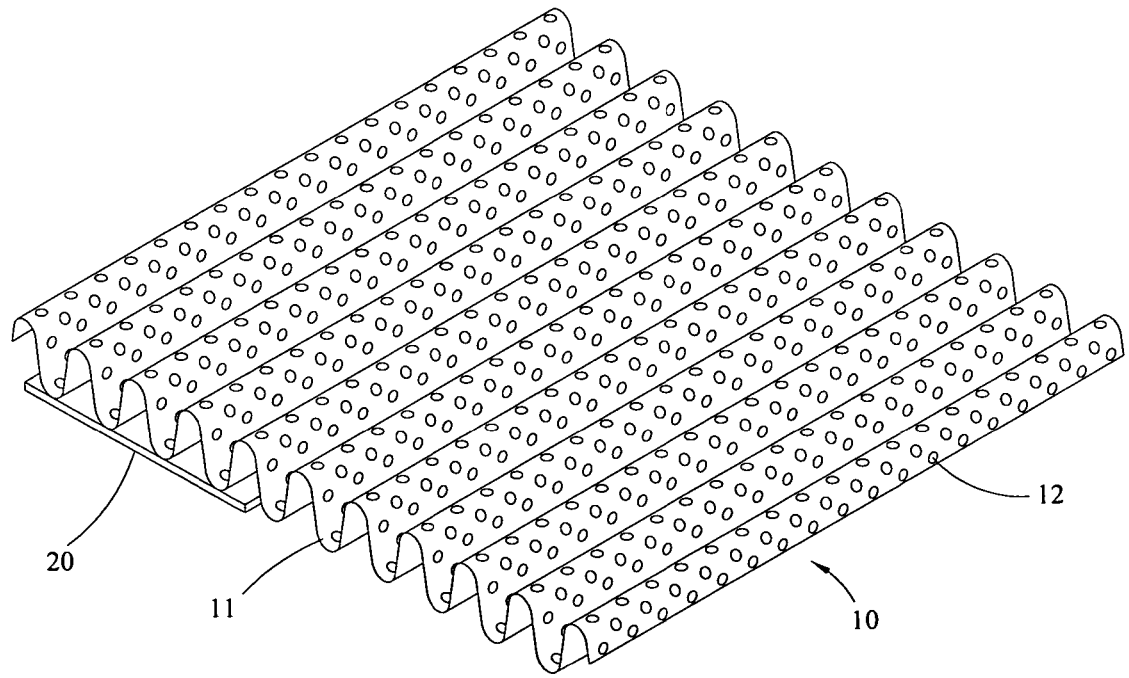
FIG. 4 is a perspective view of a filter screen structure according to a second embodiment of the present invention.
Figure 5:
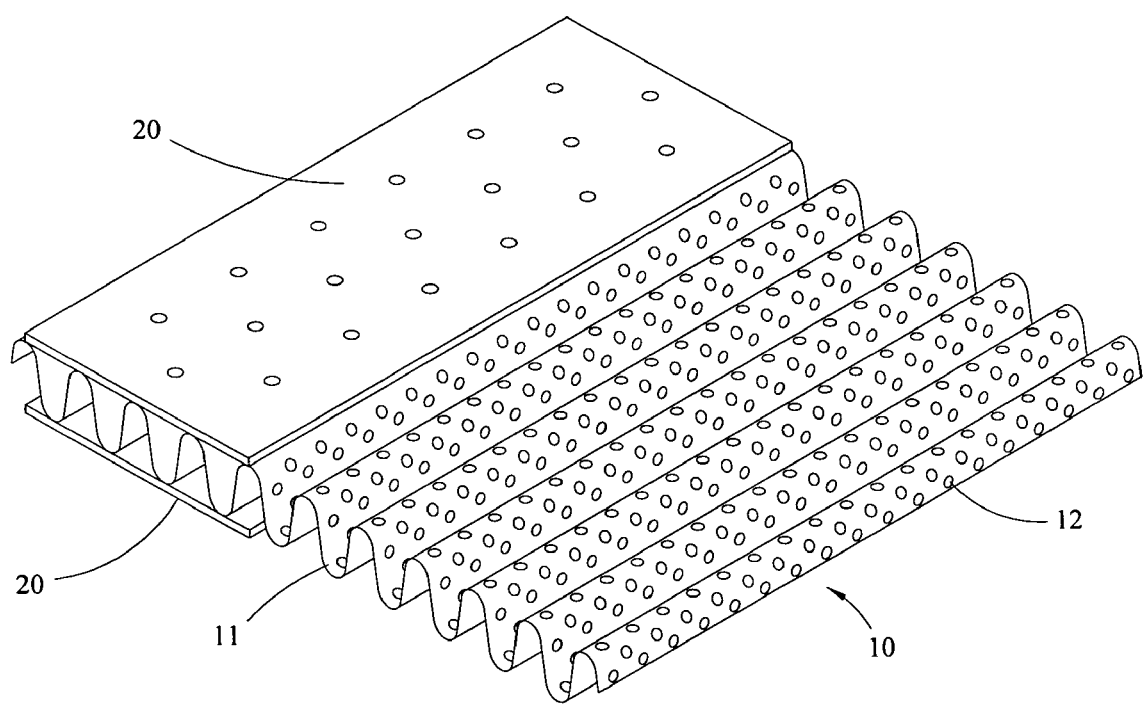
FIG. 5 is a perspective view of a filter screen structure according to a third embodiment of the present invention.

Please refer to FIGS. 3, 4, and 5, which are perspective views of a filter screen structure 10 according to a first, a second, and a third embodiment, respectively, of the present invention. As shown, the filter screen structure 10 according to the present invention includes a filter screen 11 and at least one impedance material 20. The filter screen 11 has a plurality of air vents 12 evenly distributed thereon to allow air to smoothly flow therethrough. The filter screen 11 is corrugated to include a plurality of corrugations having a constant height and a constant pitch. Therefore, the volume of air passing through the filter screen 11 under a fixed pressure is always the same. For the purpose of regulating the airflow passing through the filter screen 11, the filter screen 11 is partially or entirely covered with the impedance material 20 to increase the impedance of the filter screen 11, so as to reduce the speed of air passing through the filter screen 11. The filter screen 11 may be partially or entirely covered with the impedance material 20 to increase local or whole impedance thereof. Alternatively, the filter screen 11 may be covered with one or more layers of the impedance material 20 to increase the impedance of the filter screen 11, and accordingly regulate the quantity of airflow passing through the filter screen 11. Preferably, the impedance material 20 is selected from the group consisting of filter paper, wire screen, and perforated sheet. The position of the impedance material 20 on the filter screen 11 is determined according to the desired quantity of air flowing through different areas of the filter screen 11. The impedance material 20 may be attached to a top surface of the filter screen 11, as shown in FIG. 3; or to a bottom surface of the filter screen 11, as shown in FIG. 4; or to both of the top and the bottom surface of the filter screen 11, as shown in FIG. 5. Moreover, one or more layers of impedance material 20 may be attached to the filter screen 11 to increase the impedance of the filter screen 11. Therefore, one or more layers of the impedance material 20 could be used to partially or fully cover the top surface, the bottom surface, or both surfaces of the filter screen 11, depending on the actual need in regulating the flow of air passing through the filter screen 11.

Figure 6:
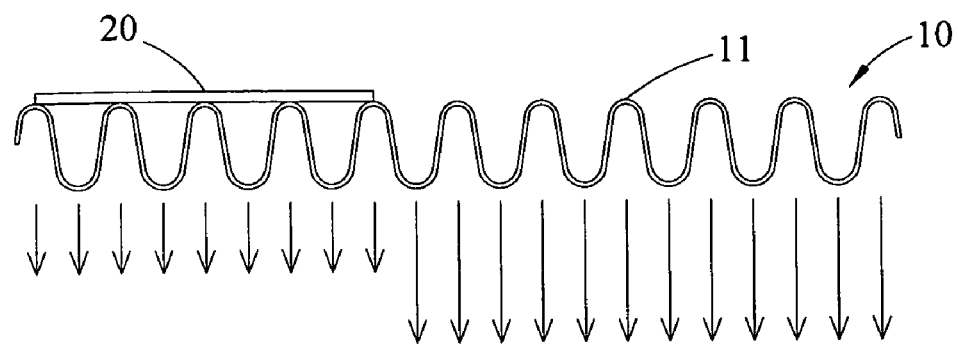
FIG. 6 is a side view of the filter screen structure according to the first embodiment of the present invention.
Figure 7:
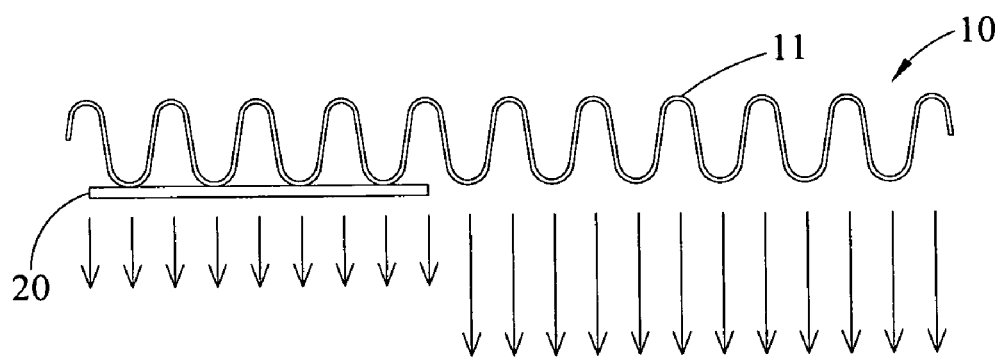
FIG. 7 is a side view of the filter screen structure according to the second embodiment of the present invention.
Figure 8:
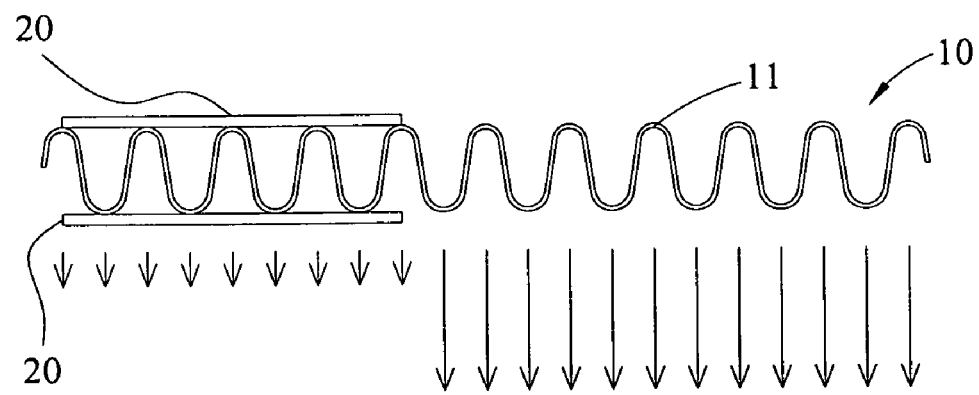
FIG. 8 is a side view of the filter screen structure according to the third embodiment of the present invention.
Figure 9:
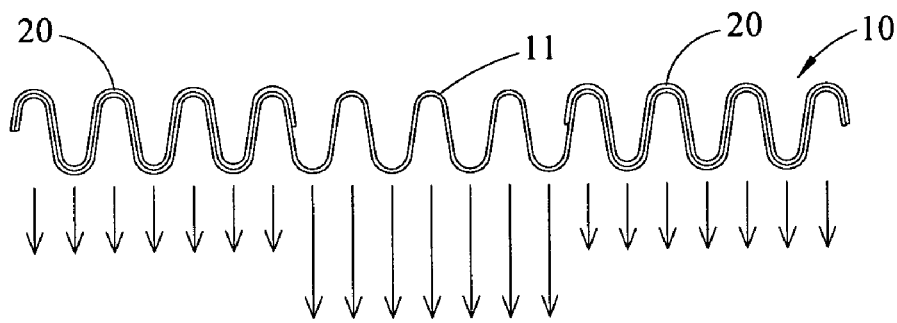
FIG. 9 is a side view of a filter screen structure according to a fourth embodiment of the present invention.
Figure 10:
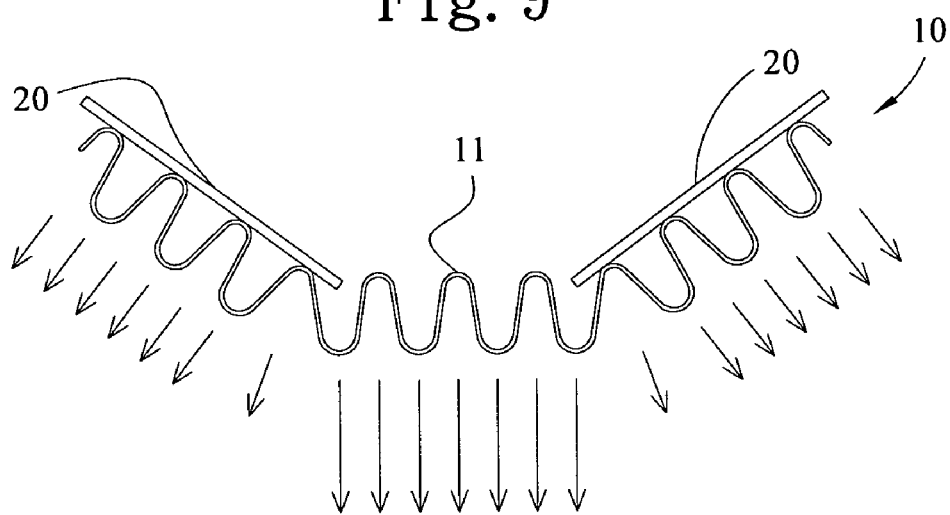
FIG. 10 is a side view of a filter screen structure according to a fifth embodiment of the present invention.

Please refer to FIGS. 6, 7, and 8, which are side views of the filter screen structure 10 according to the first, the second, and the third embodiment, respectively, of the present invention. As shown, due to a pressure difference between the top and the bottom surface of the filter screen 11, the air overcomes the impedance of the filter screen 11 to flow through the filter screen 11. When the impedance material 20 is attached to the top surface of the filter screen 11 to increase the impedance thereof, as shown in FIG. 6, the pressure difference between the top and the bottom surface of the filter screen 11 is small, and the air flows through the filter screen 11 at a reduced speed. Alternatively, when the impedance material 20 is attached to the bottom surface of the filter screen 11 to increase the impedance of the filter screen 11, as shown in FIG. 7, the pressure difference between the top and the bottom surface of the filter screen 11 is small, and the air flows through the filter screen 11 at a reduced speed, producing an effect just the same as that in the first embodiment shown in FIG. 6. When the impedance material 20 is attached to both of the top and the bottom surface of the filter screen 11 to increase the impedance of the filter screen 11, as shown in FIG. 8, the pressure difference between the top and the bottom surface of the filter screen 11 is further decreased, and the air flows through the filter screen 11 at a further reduced speed. Although not shown, when two layers of the impedance material 20 are attached to the top, or the bottom, or both of the top and the bottom surface of the filter screen 11, the air flowing through the filter screen 11 is also regulated to produce an effect the same as that in FIG. 8.

Figure 11:
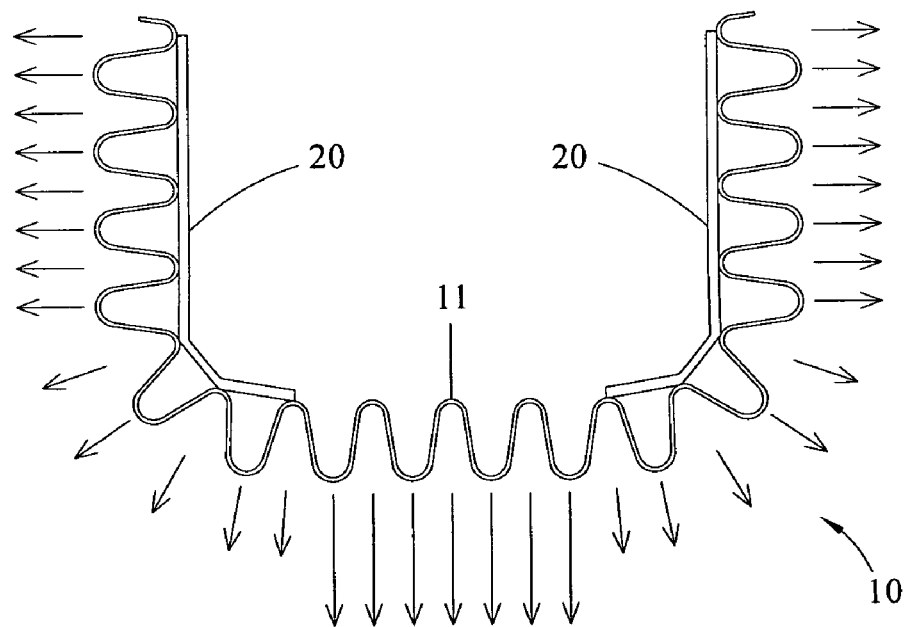
FIG. 11 is a side view of a filter screen structure according to a sixth embodiment of the present invention.
Figure 12:
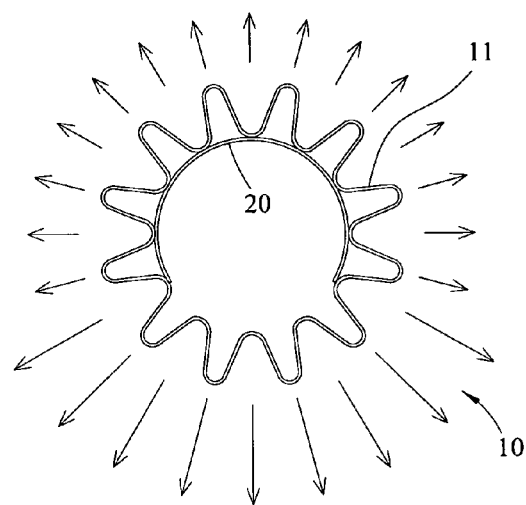
FIG. 12 is a side view of a filter screen structure according to a seventh embodiment of the present invention.

FIGS. 9, 10, 11 and 12 illustrate some further embodiments of the present invention. The filter screen structure 10 of the present invention may have a planar shape, a multiplanar shape, a non-planar shape, or a cylindrical shape. Preferably, the impedance material 20 is selected from the group consisting of filter paper, wire screen, and perforated sheet. Therefore, the filter screen structure 10 may be employed on one single plane, as a fourth embodiment shown in FIG. 9; or be employed on multiple planes, as a fifth embodiment shown in FIG. 10, to allow air to flow through the filter screen 11 in multiple directions. Preferably, the filter screen structure 10 may be employed on a curved surface. Alternatively, in a sixth embodiment of the present invention, the filter screen structure 10 may be employed on a planar surface and a curved surface at the same time, that is, on a surface including both planar and curved areas, as shown in FIG. 11. In this manner, air may flow through the filter screen 11 in different directions defined by the planar and the curved areas. FIG. 12 shows a filter screen structure 10 according to a seventh embodiment of the present invention having a hollow cylinder-shaped filter screen 11 to allow air to flow through the filter screen 11 in different radial directions. Therefore, the filter screen structure 10 of the present invention may be differently designed to meet actual application environments and requirements, and the impedance material 20 may be differently attached to the filter screen 11 to achieve the purpose of regulating the flow and direction of air passing through the filter screen 11.

Figure 13:
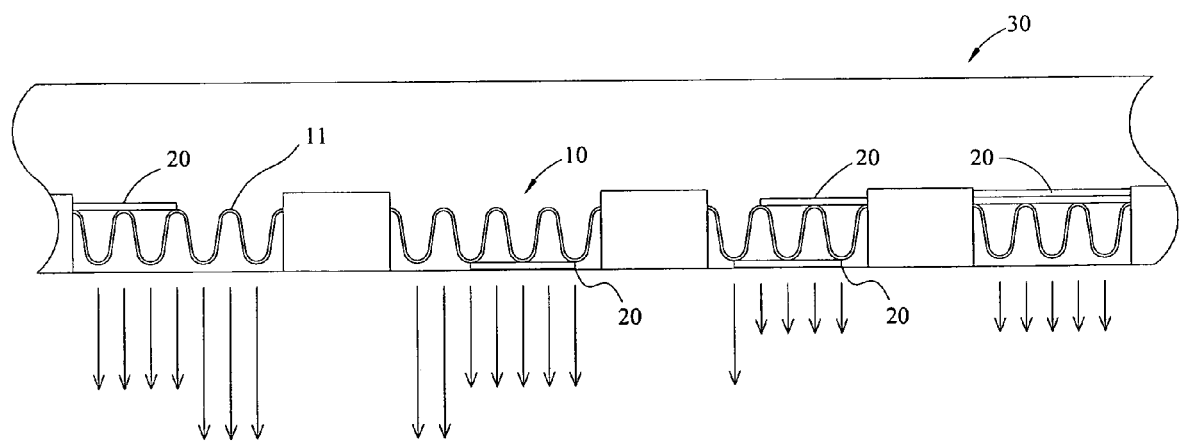
FIG. 13 shows an application of the filter screen structure of the present invention.

FIG. 13 illustrates an example of application of the filter screen structure 10 of the present invention. In this example, the filter screen structure 10 is mounted in a linear duct 30 to regulate the pressure at a front and a rear end of the duct 30, and the lateral diffusion of air in the duct 30. According to the needed amounts of air flown through the filter screen 11 at different locations in the duct 30, one or more layers of the impedance material 20 may be locally or fully attached to one or two surfaces of the filter screen 11 at different areas in the duct 30.

In brief, the filter screen structure 10 of the present invention employs one or more layers of impedance material 20 to increase the impedance of the filter screen 11 and thereby reduces the speed of air flowing through the filter screen 11. And, the impedance material 20 may be differently attached to the filter screen 11 to effectively regulate the flow of air passing through the filter screen 11.

What is claimed is:

1. A filter screen structure, comprising
   a filter screen having a plurality of air vents evenly distributed thereon; and
   at least one impedance material being attached to said filter screen at predetermined positions to regulate a flow of air passing through said filter screen via said impedance material,
   wherein said filter screen is corrugated to include a plurality of corrugations, and
   wherein the at least one impedance material has a planer shape including a plurality of air vents,
   wherein the air vents of the impedance material are spaced further apart from one another than are the air vents of the filter screen, such that a density of the air vents of the impedance material is less than a density of the air vents of the filter screen; and
   wherein a partial area of one side of said filter screen is partially covered by said planer-shaped impedance material, and a different partial area of an opposite side of said filter screen is partially covered by said planer-shaped impedance material.

2. The filter screen structure as claimed in claim 1, wherein said impedance material is selected from the group consisting of filter paper, wire screen, and perforated sheet.

3. The filter screen structure as claimed in claim 1, wherein said filter screen has a non-planar shape.

4. The filter screen structure as claimed in claim 1, wherein said planer-shaped impedance material is attached to a top surface of said filter screen.

5. The filter screen structure as claimed in claim 1, wherein said planer-shaped impedance material is attached to a bottom surface of said filter screen.

6. The filter screen structure as claimed in claim 1, wherein said planer-shaped impedance material is attached to both a top and a bottom surface of said filter screen.

7. The filter screen structure as claimed in claim 1, wherein said filter screen is partially covered by said planer-shaped impedance material.

8. The filter screen structure as claimed in claim 1, wherein said filter screen is covered by one layer of said planer-shaped impedance material.

9. The filter screen structure as claimed in claim 1, wherein said filter screen is covered by more than one layer of said planer-shaped impedance material.

10. The filter screen structure as claimed in claim 1, wherein said filter screen is partially covered on both sides by said planer-shaped impedance material.

11. A linear duct for regulating fluid pressure at a front and rear of the duct, and a lateral diffusion of the fluid in the duct, comprising
 a plurality of filter structures mounted at different locations in the duct, each of the plurality of filter structures including
 a filter screen having a corrugated shape and a plurality of fluid vents evenly distributed thereon, and
 at least one impedance material attached to at least one surface of the filter screen at predetermined positions of to regulate a flow of fluid passing through said filter screen via said impedance material.

12. A filter screen structure, according to claim 11, wherein the filter screen and the at least one impedance material have substantially the same shape.

13. A filter screen structure, according to claim 11, wherein the at least one impedance material has a planar-shape.

* * * * *